June 22, 1926.
E. C. SWANSON
1,590,131
MULTIPLE SECTION HARROW
Filed April 24, 1924  2 Sheets-Sheet 2
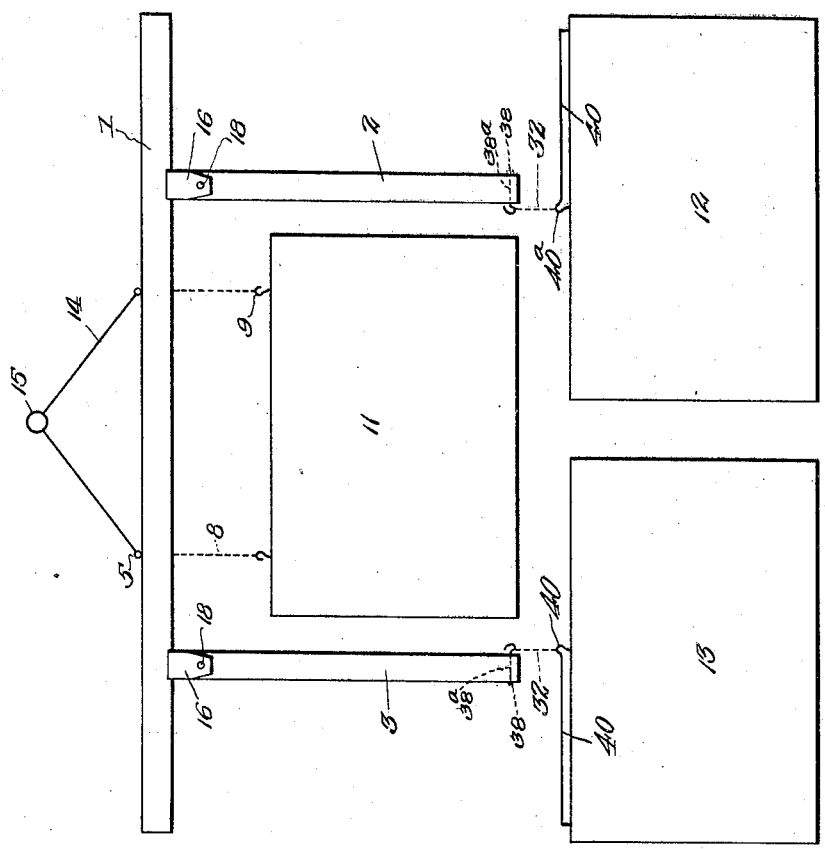
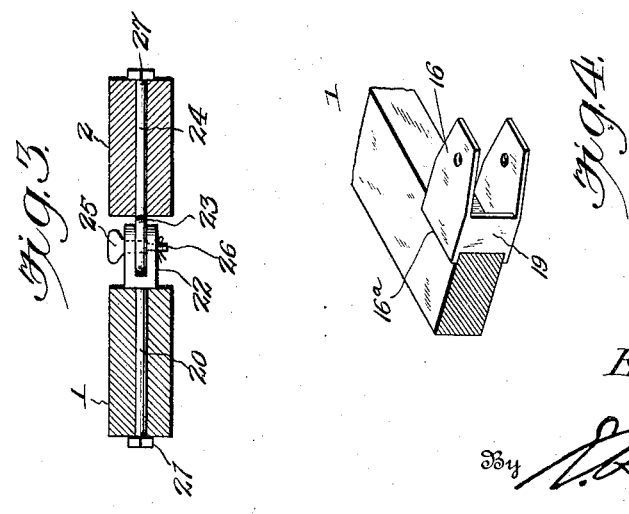

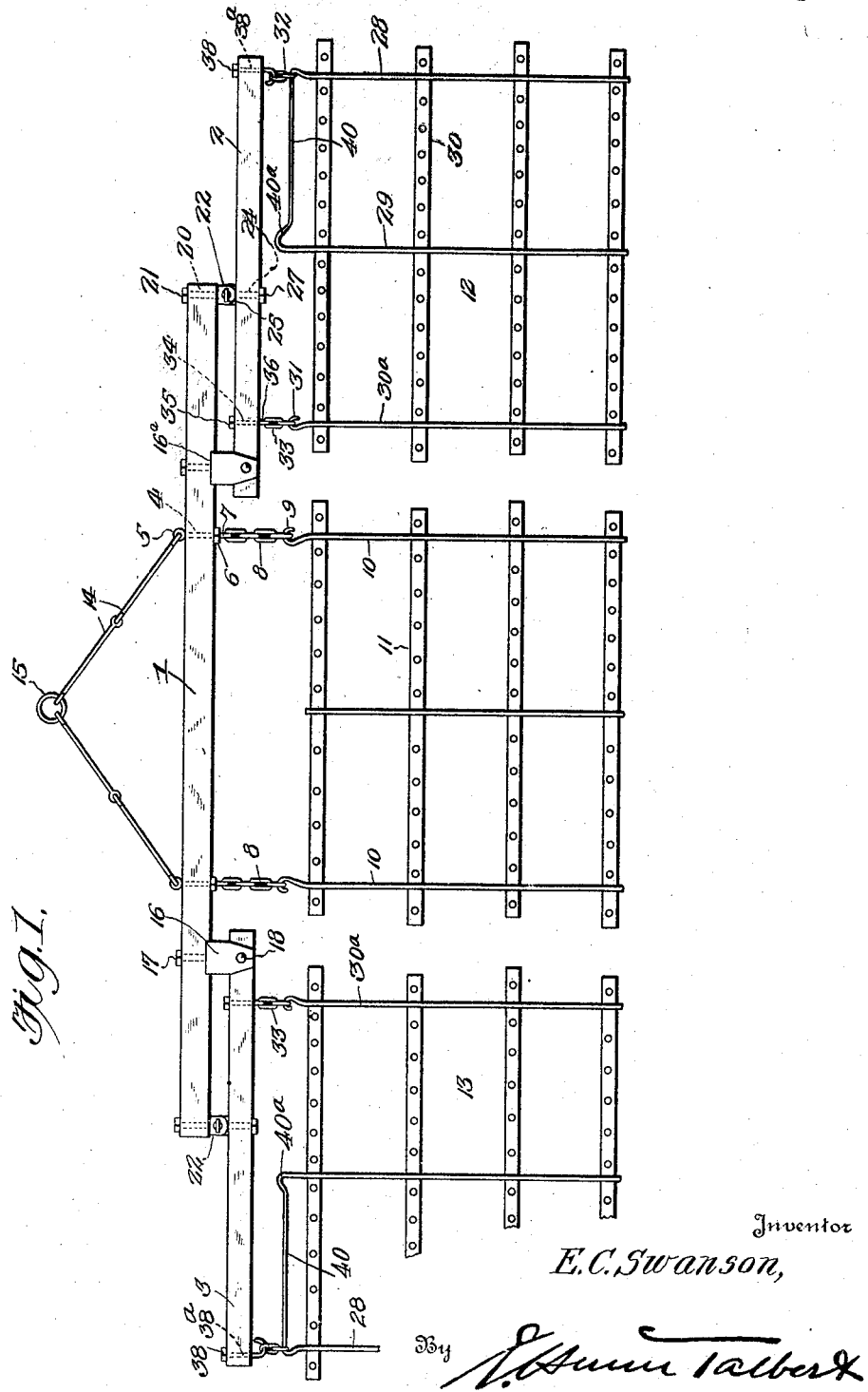

Patented June 22, 1926.

1,590,131

UNITED STATES PATENT OFFICE.

EDWIN C. SWANSON, OF STROMSBURG, NEBRASKA.

MULTIPLE-SECTION HARROW.

Application filed April 24, 1924. Serial No. 708,753.

It has been found that the average standard three section drags or harrows are constructed too wide to pass through the average farm gate without necessitating considerable inconvenience and trouble in doing so. The sections of this type of harrow either have to be detached or lifted at their remote ends or folded over on the intermediate section, requiring much difficulty not only in passing through the gate but in arranging the sections in position to permit of the passage of the harrow and restoring the sections to their normal positions subsequent to the passage of the harrow through the gate.

It is, therefore, the purpose of the present invention to provide, in a multiple section drag or harrow of the adjustable or collapsing type, a construction wherein the end sections of the harrow may be very easily and conveniently disposed in the rear of the central part of the harrow to permit the harrow to easily and readily pass through an ordinary farm gate without lifting the end portions of the remote harrow sections or without detaching certain of the sections or without folding certain of the sections upon other of the sections.

Another purpose is to provide a very simple construction whereby certain of the sections may be easily disposed in the rear of the central portion of the harrow without any of the sections interfering with each other.

Still another purpose is to provide, in a harrow construction of this type, main and auxiliary draft trees, the latter being adjustable in different positions relative to the main draft tree to enable the end sections of the harrow to be disposed to trail in the rear of the central portion of the harrow, the auxiliary draft trees being so positioned, when certain of the sections are trailing in the rear of the central part of the harrow, as to overlap or contact with the central part of the harrow and maintained so as to prevent the trailing sections from interfering with each other.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a plan view of the improved multiple section harrow of the adjustable type constructed in accordance with the invention, the sections thereof being disposed in order to present the maximum width of harrow when in use on the field.

Figure 2 is a plan view showing certain of the harrow sections adjusted or disposed in order to trail in the rear of the central part of the harrow, thereby reducing the width of the harrow and enabling the same to pass through a farm gate without contacting with the hinge or latch posts thereof.

Figure 3 is an enlarged detail sectional view of the detachable connection between the main and auxiliary draft trees.

Figure 4 is an enlarged perspective view of a U-shaped coupling which is carried by the dominant draft tree.

Referring to the drawings, 1 designates a dominant draft tree and 2 and 3 the auxiliary right and left draft trees. Bolts 4 provided with eyes 5 pass through the dominant draft tree and have nuts 6 threaded thereon. The nuts have integral links 7 which constitute end members of the draft chains 8 which, in turn, connect to the hooks 9 of the rods 10 of the central harrow section 11. The transverse bars of the harrow section have the usual harrow teeth as illustrated.

The ends of the transverse bars of the harrow section are not aligned but terminate in irregular positions in order to cooperate with the adjacent ends (which are also irregularly positioned, of the bars of the remote end harrow sections 12 and 13 so that, when the drag or harrow is traversing the field, the leaving of unharrowed pathways may be prevented. The hooks 9 of the rods of the harrow section 11 are of such construction as to permit the chains to be detached for the purpose of disconnecting the central harrow section, if so desired, either for repairs or for permitting a new section to be applied.

Suitable draft irons or rods 14 are connected to the eyes 5 and converge and have their converged ends connected to a draft ring 15 to which a conventional form of draft equalizer may be attached. U-shaped draft couplings 16 are secured by bolts 17 to the dominant draft tree 1. The couplings are spaced a requisite distance from the terminals of the draft tree 1 and a short distance from the draft chains 8 so as to permit the auxiliary draft trees 2 and 3 to fold back toward the ends of the harrow section 11.

The auxiliary draft trees are pivoted on bolts 18 which pass through the arms of the draft couplings 16 with nuts upon their lower ends. The draft couplings have remote end walls 19 which limit the auxiliary draft trees 2 and 3 in their positions when extending rearwardly, thereby preventing said auxiliary draft trees from contacting with the ends of the intermediate harrow section 11.

Extending transversely of the terminals of the draft tree 1 are bolts 20 to the forward ends of which nuts 21 are threaded while their other ends have bifurcated heads 22 between which the eyes 23 of the bolts 24 (which pass through the auxiliary draft trees 2 and 3) are arranged. Bolts 25 pass through the arms of the bifurcated heads and through the eyes 23 and have their lower ends threaded at 26 in the lower arms of the heads, thereby constituting a clevis connection between the auxiliary and main draft trees. The bolts 24 have nuts 27 to hold them in place.

The harrow sections 12 and 13 are similar in construction to the harrow section 11, that is, they consist of the rods 28, 29 and 30ª and the bars 30 which have harrow teeth as shown. The rods 28 and 29 are connected integrally by transverse rods 40 which are bent at 40ª where they join the rods 29 to cause loops to be formed. Chains 32 connect with the rods 40, particularly when the harrow sections are arranged as in Figure 1, that is, at a point adjacent the ends of the rods 28. The rods 30ª have hooks 31 to which the chains 33 are detachably connected. The chains 32 are connected to hooks of bolts 38ª which pass through the ends of the draft trees 2 and 3 and have nuts 38. The adjacent end portions of the auxiliary draft trees 2 and 3 have bolts 34 passing therethrough provided with nuts 35 at their forward ends and eyes 36 at their rear ends, and to the latter the chains 33 are connected.

It will be noted that the rods 40 slide through certain of the end links and when the harrow sections are disposed as in Figure 2, the chains 32 will engage with the offset loops 40ª of the rods 40 where they unite with the rods 29. The draft couplings 16 have short flanges 16ª which straddle the draft tree 1, thereby preventing the draft couplings from turning upon their central bolts which are used for connecting the draft couplings to the draft tree 1.

Under ordinary conditions, that is, when traversing a field, the several harrow sections are disposed as in Figure 1 for the purpose of harrowing a relatively wide strip during each passage of the harrow. However, when it is desired to pass through the minimum width of farm gate, the bolts 25 are removed from the bifurcated heads and the chains 33 disconnected from the hooks 31, then the rods 40 are slid through certain of the end links of the chains 32, or the chains 32 allowed to slide on the rods 40, until the harrow sections 12 and 13 assume the positions as in Figure 2 and until certain of the end links of the chains 32 engage with the offset loops 40ª. When these parts are so connected, the draft trees 2 and 3 are permitted to swing in order to extend rearwardly as in Figure 2, in which case the harrow sections 12 and 13 will overlap and drag in the rear of the harrow section 11 and when the harrow sections are so disposed, it is possible to pass through the minimum width of farm gate.

It will be noted that under the scope of the claims, it is possible to mount or connect two harrows centrally to the dominant draft tree in identically the same manner as the harrow section 11 is connected. In this case, with two end harrow sections connected to the dominant draft tree as is at present disclosed, it is possible to construct a very wide harrow and thereby permit four harrow sections to be used instead of three.

The invention having been set forth, what is claimed is:

1. In a multiple section harrow, the combination with a dominant draft tree having central harrowing means, of auxiliary draft trees pivotally connected to the terminal portions of the dominant draft tree and provided with auxiliary end harrow sections, and means for detachably connecting substantially the intermediate portions of the auxiliary draft trees to the terminal extremities of the dominant draft tree to normally hold them in parallelism with the latter and whereby, upon disconnection, the auxiliary draft trees may be disposed to extend rearwardly to permit the end harrow sections to drag in the rear of the central harrowing means.

2. A multiple section harrow including dominant and auxiliary draft trees of which the latter have terminal pivotal connections with the former at intermediate points on the same, detachable connections between the terminals of the dominant draft tree and intermediate points on the auxiliary draft trees, a central harrow section connected with the dominant draft tree and harrow sections connected with the auxiliary draft trees, the last said harrow sections being detachably connected with their draft trees at the inner ends of the latter and having sliding connections at the outer ends, so that the line of draft of the last said section may be centrally of the latter when the detachable connections between the auxiliary and dominant draft trees are disconnected.

3. In a multiple section harrow, the combination with a dominant draft tree having central harrowing means, of auxiliary draft trees pivotally connected to the terminal portions of the dominant draft tree and provided with auxiliary end harrow sections, means for detachably connecting substantially the intermediate portions of the auxiliary draft trees to the terminal extremities of the dominant draft tree to normally hold them in parallelism with the latter and whereby, upon disconnection, the auxiliary draft trees may be disposed to extend rearwardly to permit the end harrow sections to drag in the rear of the central harrowing means, and means to prevent the auxiliary draft trees from swinging toward and engaging with the terminal portions of the central harrowing means.

4. A multiple section harrow including dominant and auxiliary draft trees, harrowing means connected to the central portion of the dominant draft tree, draft couplings including pivots connecting the auxiliary draft trees to the dominant draft tree, whereby the auxiliary draft trees may extend rearwardly, and harrows adjustably connected to the auxiliary draft trees whereby they may drag in the rear of the central harrowing means, said draft couplings having abutments with which certain ends of the auxiliary draft trees contact to limit them in their rearward positions and prevent them from moving toward and contacting with the terminals of the central harrowing means.

5. A multiple section harrow including dominant and auxiliary draft trees, harrowing means connected to the central portion of the dominant draft tree, draft couplings including pivots connecting the auxiliary draft trees to the dominant draft tree, whereby the auxiliary draft trees may extend rearwardly, harrows adjustably connected to the auxiliary draft trees whereby they may drag in the rear of the central harrowing means, said draft couplings having abutments with which certain ends of the auxiliary draft trees contact to limit them in their rearward positions and prevent them from moving toward and contacting with the terminals of the central harrowing means, and means for detachably connecting the auxiliary draft trees to the terminals of the dominant draft tree to hold the dominant and auxiliary draft trees in parallelism, with the harrows which are carried by the auxiliary draft trees in horizontal alignment with the central harrowing means.

6. A multiple section harrow including a dominant draft tree provided with a central harrow, draft couplings connected to the terminal portions of the dominant draft tree, said couplings being U-shaped, auxiliary draft trees having their adjacent ends pivotally mounted on the U-shaped couplings, harrows detachably connected to the auxiliary draft trees, means detachably connecting the auxiliary draft trees to the terminals of the dominant draft tree to hold the trees in parallelism, and abutment means carried by the U-shaped couplings with which the adjacent terminals of the auxiliary draft trees engage when the auxiliary draft trees are detached from the terminals of the dominant draft tree and permitted to extend rearwardly, thereby preventing the auxiliary draft trees from contacting with the terminal portions of the central harrow.

In testimony whereof he affixes his signature.

EDWIN C. SWANSON.